(No Model.)

H. C. HUGHES.
MANUFACTURE OF STAINED GLASS PANELS.

No. 519,186. Patented May 1, 1894.

WITNESSES:
C. Sedgwick
E. M. Clark

INVENTOR
H. C. Hughes
BY
Munn & Co.
ATTORNEYS.

THE NATIONAL LITHOGRAPHING COMPANY,
WASHINGTON, D. C.

UNITED STATES PATENT OFFICE.

HENRY CLIFFORD HUGHES, OF LONDON, ENGLAND.

MANUFACTURE OF STAINED-GLASS PANELS.

SPECIFICATION forming part of Letters Patent No. 519,186, dated May 1, 1894.

Application filed March 25, 1893. Serial No. 467,565. (No model.)

*To all whom it may concern:*

Be it known that I, HENRY CLIFFORD HUGHES, gentleman, of 15 Marlborough Road, St. John's Wood, London, N.W., England, have invented new and useful Improvements in the Manufacture of Stained-Glass Panels, of which the following is a full, clear, and exact description.

My invention relates to further improvements in the manufacture of stained glass panels composed of pieces of differently-colored glass, juxtaposed according to any given artistic design and welded together, painted with vitrifiable enamel color and welded to a covering sheet of plain glass, as described in the specification of a former patent dated the 28th day of June, 1892, No. 477,990.

My present invention has for its object to enable such works of art to be produced better and more cheaply, and it consists mainly in the substitution for the sheet platinum used in the process as described in the specification of my former patent, of a much cheaper material which is not liable to oxidation and is not more liable than the platinum to adhere to the glass, which does not require to be peeled off as carefully as does the platinum in order to avoid breakage of the glass or injury to itself, and of which any portions remaining adherent to the glass may be easily removed therefrom by scraping or rubbing.

The invention also relates to an improved bed upon which the welding together of the pieces of glass is effected, such improved bed replacing the fireclay slab described in my previous specification, which slab is not only liable to be cracked by the heat of the furnace in the welding operation but is also liable to become warped or distorted so that it no longer presents the plane surface necessary for the support of the glass panel to which the distortion then becomes imparted.

The invention will be described with reference to the accompanying drawings, forming part of this specification, in which—

Figure 1:
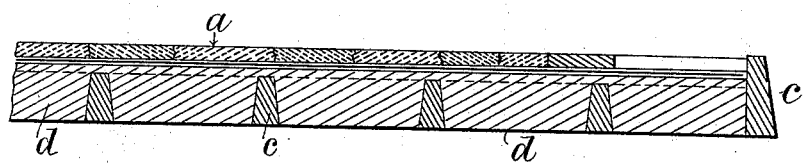
Figure 2:
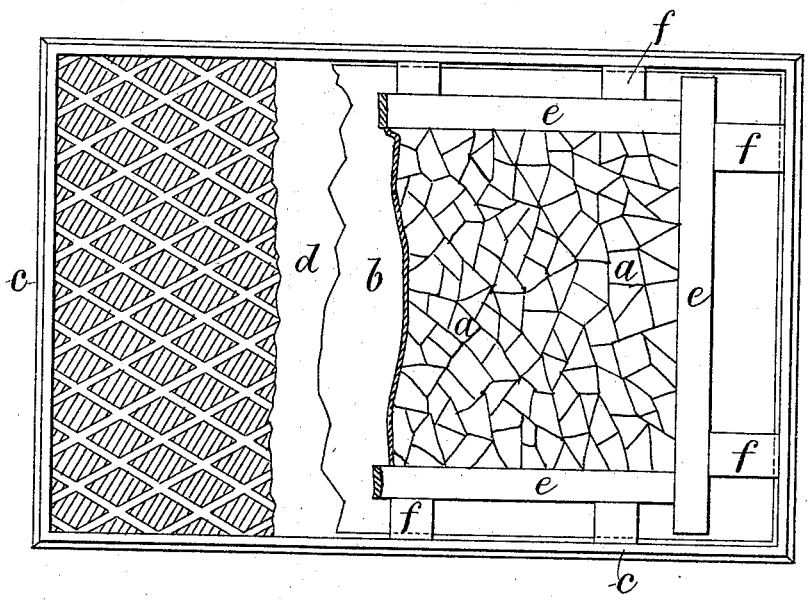

Figure 1 is a part longitudinal vertical section through the bed and the glass mosaic supported thereon. Fig. 2 shows a plan of the bed with the mosaic in position thereon, drawn to a smaller scale and partly broken away to show the frame of the bed.

According to my present improvements, the welding together of the pieces of stained glass $a$ is effected by laying them upon a sheet of mica $b$ the said sheet being made of the necessary dimensions by joining together small sheets of mica by covering strips of the same material, cemented thereto by water glass or a vitreous flux, the sheet of mica being supported upon a bed, constructed as hereinafter described. The pieces of stained glass are of different colors or shades and are cut out of the proper sizes and shapes to suit the design to be produced, and they are fitted together edge to edge as closely as practicable. A transparent vitreous flux is then applied to the joints to soften the glass at the edges and bring them to the welding point. In the former process the welding was effected by superposing upon the pieces of glass an upper sheet of platinum weighted by a fire clay or iron slab, but this upper sheet of platinum and slab I now dispense with and when the edges of the pieces of glass are brought to the welding point they are pressed into close contact by the application on the joints of an iron tool introduced through a suitable aperture in the furnace at which the manipulation of the tool, the arrangement of the pieces of glass, and the progress of the whole operation, may be watched, there being no top slab or plate to obstruct the view as was previously the case. Should the mica adhere to the glass as is frequently the case in parts, the greater portion of the mica, owing to its laminated and easily cleavable structure, may be easily torn or split off, leaving adherent to the glass only such thin laminæ as may be easily scraped or rubbed off with sand and water or which being transparent will not be visible if left adhering, whereas when platinum is used it adheres somewhat tenaciously and great care is necessary in peeling it off from the glass both to avoid breakage of the glass and injury to the platinum itself, which is a very expensive item of the "material" employed in the process whereas the mica is comparatively so much cheaper that should it even be destroyed in effecting its removal from the glass its loss will be more than compensated by the diminished chance of breakage.

The bed upon which the operation is performed is constructed of a cast metal frame c of lattice-work or cellular form so as to provide spaces or pockets to receive and retain a mass of whiting or equivalent material d, the upper surface of the frame being covered to a uniform depth with this material, so as to form a smooth level surface to which the metal frame imparts sufficient strength and rigidity to admit of its being handled, the whiting in which the frame is embedded protecting the frame from the heat of the furnace.

e e are strips or bars of fireclay, laid on the bed to form a marginal frame within which the pieces of glass forming the mosaic are arranged and f, f, are packing pieces placed between the bars e and the upwardly-standing flanges on the frame to hold bars e in position.

The succeeding operations of painting on the welded glass mosaic with vitrifiable enamel colors, firing the same and then protecting the artistic work by a sheet of white glass covering over and welded to the whole of the artistically treated surface of the stained glass mosaic, is performed in the way described in the previous specification (except that a sheet of mica is used instead of platinum for preventing the adhesion of the glass to the bed) the stained glass mosaic and the covering sheet being pressed into close contact by a heavy iron tool.

I claim—

1. The herein described improvement in the process of manufacturing stained glass panels, which consists in placing the pieces of glass upon a suitable supporting surface and fitting the edges of said pieces together, applying a vitreous flux to the joints, bringing the juxtaposed edges to a welding point, and then applying a suitable tool locally to the several joints, and pressing the edges into close contact, substantially as specified.

2. A bed for use in the manufacture of stained glass panels, comprising a metallic frame, a heat resisting filling material for said frame, and a sheet of mica supported upon the surface of said filling material, as and for the purpose specified.

3. In the manufacture of stained glass panels, a bed for supporting the pieces of glass, consisting of a metal open work or cellular frame, a filling of whiting or equivalent material held in and covering said frame, a sheet of mica supported upon the upper surface of said filling material, strips or bars laid on the said sheet of mica to form a frame within which the pieces of glass are arranged—and packing pieces arranged between the said bars and the sides of the metal frame, substantially as herein described.

Dated this 17th day of February, 1893.

HENRY CLIFFORD HUGHES.

Witnesses:
T. W. KENNARD,
  53 *Chancery Lane, London, Clerk.*
THOMAS LAKE,
  17 *Gracechurch Street, London.*